Aug. 14, 1956 W. S. PRAEG 2,758,363
INSERTED BLADE GEAR CUTTER
Filed April 7, 1952 2 Sheets-Sheet 1
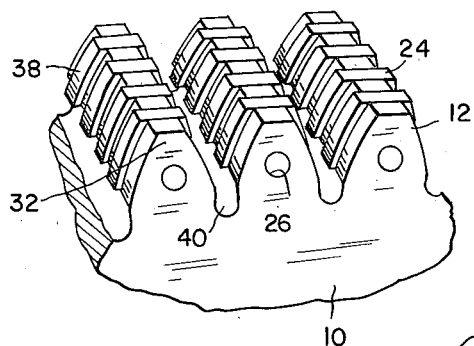
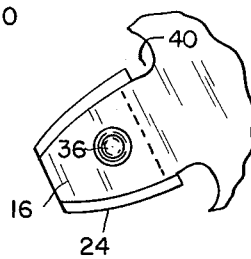
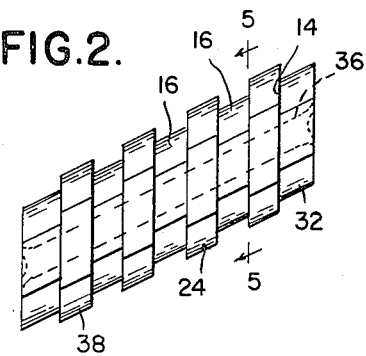
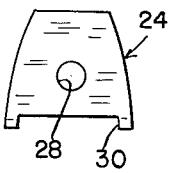
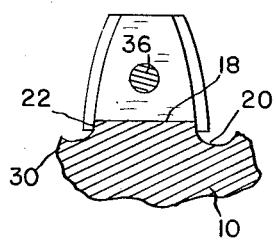
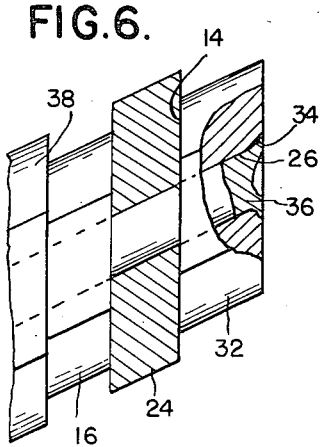
INVENTOR.
WALTER S. PRAEG
BY Whittemore
Hulbert & Belknap
ATTORNEYS Aug. 14, 1956 W. S. PRAEG 2,758,363
INSERTED BLADE GEAR CUTTER
Filed April 7, 1952 2 Sheets-Sheet 2

INVENTOR.
WALTER S. PRAEG
BY Whittemore,
Hulbert & Belknap
ATTORNEYS

United States Patent Office 2,758,363
Patented Aug. 14, 1956

2,758,363
INSERTED BLADE GEAR SHAVING CUTTER

Walter S. Praeg, Detroit, Mich., assignor to National Broach & Machine Company, Detroit, Mich., a corporation of Michigan Application April 7, 1952, Serial No. 280,972
11 Claims. (Cl. 29—105)

The present invention relates to an inserted blade gear shaving cutter.

Gear shaving cutters of the type referred to are employed to finish the teeth of gears. The cutters are gearlike members having teeth provided with cutting edges extending generally up and down the teeth of the cutter and these cutters in the past have ordinarily been formed by providing serrations in the sides or flanks of the teeth. Cutters of this general type are familiar and reference is made to prior Drummond Patent 2,126,178 for a complete disclosure thereof.

It is an object of the present invention to provide gear shaving cutters of the type referred to characterized by the provision of inserted cutting blades formed of hard material such for example as high speed steel, tungsten carbide, or the like.

It is a further object of the present invention to provide a gear shaving cutter comprising a gear-like blank of metal shaped to gear form, the teeth of which are slotted, and provided with inserted blades of hard cutting material such as high speed steel, tungsten carbide, or the like.

It is a further object of the present invention to provide a gear shaving cutter in the form of a gear having slotted teeth provided with holes extending longitudinally of the teeth in combination with blades formed of hard material inserted in the slots in the teeth of the cutter, the blades having openings therein, and pins extending through the holes in the teeth and the openings in the blades.

It is a further object of the present invention to provide a gear shaving cutter as described in the preceding paragraph in which the slots in the teeth terminate outwardly from the roots of the teeth so as to provide outwardly facing shoulders at the bottoms of the slots, the blades having projections at their inner ends engaging the shoulder.

It is a further object of the present invention to provide a gear shaving cutter comprising a gear-like body, circumferential slots extending below the roots of the teeth, inserted blade segments each having a plurality of tooth portions, and means anchoring the segments in the slots of the body.

Other objects and features of the invention will become apparent as the description proceeds, especially when taken in conjunction with the accompanying drawings, wherein:

Figure 1 is a fragmentary perspective view of a gear shaving cutter of the type illustrated.

Figure 2 is a plan view of a single tooth of such cutter.

Figure 3 is an end view of the tooth shown in Figure 2 together with a portion of the cutter body.

Figure 4 is a side view of an inserted blade of the type used in the cutter.

Figure 5 is a section on the line 5—5, Figure 2.

Figure 6 is an enlarged view partly in section of a tooth of the cutter.

Figure 7:
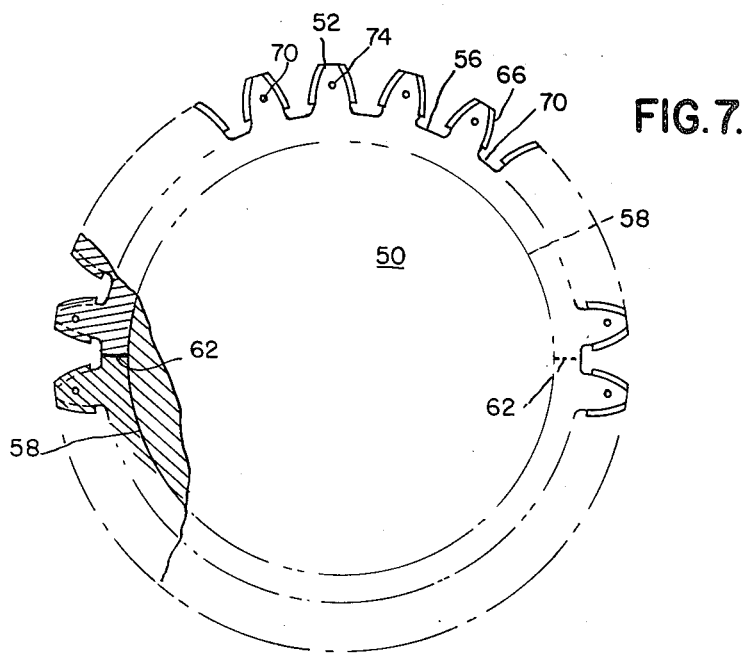
Figure 7 is a fragmentary elevational view of a modified cutter.

Referring now to the drawings, the cutter comprises a cutter body 10 in the form of a gear having teeth indicated generally at 12, these teeth being provided with transversely extending slots 14. The slots are spaced apart to leave blade supporting tooth portions 16 the sides of which are perpendicular to the axis of the cutter body 10. Preferably, as best illustrated in Figure 5, the slots terminate in a bottom wall 18 disposed somewhat radially outwardly from the roots 20 of the teeth so as to leave outwardly facing shoulders 22 thereat.

The teeth 12 of the blank are initially formed with a relatively thin transverse cross-section. Thus, the teeth 12 of the cutter have a circumferential dimension less than sufficient to produce true conjugate mating action with the gear for which the cutter is intended.

In order to provide the necessary cutting edges cutting inserts 24 formed of a hard cutting material such for example as tungsten carbide, are provided. These blades are flat and designed to fit snugly between the blade supporting portions 16 of the cutter body. In order to retain the blades in assembled relation, the teeth 12 are provided with longitudinally extending holes 26 and each of the blades is provided with a corresponding opening 28, the openings in the blades being disposed to align themselves with the holes through the teeth when the blades are inserted between adjacent blade supporting portions 16.

Preferably, in order to impart additional stability to the assembled cutter, the blades 24 include inwardly extending projections 30 at their inner corners which are adapted to engage against the outwardly facing shoulders 22 provided on the cutter body.

Preferably, the outer blade supporting portions 32 provided at the ends of each tooth of the cutter, are somewhat thicker than the intermediate blade supporting portions and the hole 26 therethrough is preferably countersunk or enlarged as indicated at 34. The pin 36 which extends through the holes in the teeth and through the openings 28 in the blade, is peened or staked or otherwise outwardly expanded to cooperate with the countersink in such a way as to avoid projection beyond the outer or end surface of the end blade supporting portion 32, as clearly seen in Figure 6.

The blades may be formed of any suitable material for cutting gears and the present invention is intended primarily to permit the use of extremely hard blades formed of materials such for example as tungsten carbide. Blades of this and similar materials may be formed with a considerable degree of accuracy to the required final shape, including the profile surface 38 thereof. However, after assembly of the blades into the cutter and firm attachment of the blades in the slots in the cutter body, the profile surfaces 38 will be ground or trimmed to the exact tooth form profile desired.

As illustrated in the prior Drummond patent referred to above, it is desirable to provide enlarged transverse passages or channels along the roots of the teeth such as the passages indicated at 40 in Figure 1. Where the cutter is formed by serrating the teeth of an integral gear-like blank, the provision of this enlarged arcuate channel ordinarily requires a separate drilling or cutting operation. However, in the present case this is not required since the provision of relatively thin teeth in conjunction with relatively wider blades produces such an enlarged channel as indicated at 40. This channel permits transverse flow of oil through the cutter along the roots of the teeth and facilitates carrying away the fine chips or shavings which result from the gear finishing operation.

Figure 9:
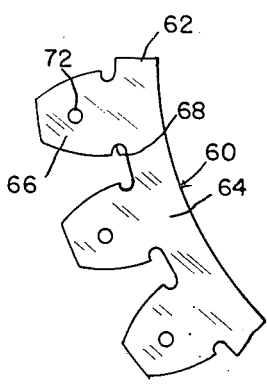
Figure 9 is a fragmentary elevational view of one end of a segmental strip of the type employed in the cutter illustrated in Figures 7 and 8.

The embodiment of the invention described above requires a separate inserted element for each slot in each tooth and accordingly, a relatively large number of inserts are required. However, the number of inserts may be substantially reduced by employing the modification of the invention illustrated in Figures 7-9.

According to this embodiment of the invention the gear shaving cutter comprises a body 50 in the form of a gear having teeth 52 which may correspond generally to the desired final tooth shape but is characterized in that the teeth 52 are of less thickness or circumferential extent than desired for the final tooth form.

Figure 8:
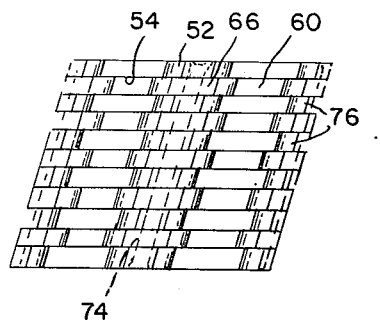
Figure 8 is a fragmentary view looking down on the top of a tooth.

The body 50 is provided with a plurality of relatively thin circumferential slots 54. These slots extend into the body 50 to a depth substantially below the roots or bottoms 56 of the spaces between adjacent teeth 52. In Figure 7 the bottom of the slots is indicated at 58.

Cutting inserts in the form of flat strips 60 of generally arcuate shape are provided. As illustrated in Figure 7, these strips are shown as of 180 degrees angular extent, the ends as indicated at 62 being in abutment in the assembled cutter. However, the number of arcuate strips may of course be reduced and three, four or more such strips provided. As a limiting condition, the strips may have an angular extent corresponding to only two teeth of the body.

The inner portions 64 of the strips 60 are continuous from end to end and the outer portions of the strip are formed to provide tooth portions 66 which correspond generally to the shape of the teeth 52 but are relatively wider or of greater circumferential extent. The tooth spaces intermediate the teeth 66 of the strips are laterally enlarged as indicated at 68 so that in the completed cutter these lateral enlargements 68 define laterally enlarged curved channels 70, the outer ends of which are smoothly curved. These channels constitute passages for the flow of oil during the cutting operation.

In order to retain the arcuate strips 60 in assembled relation in the slots 54 of the body 50, the teeth 52 of the body and the tooth portions 66 of the strips are provided with openings 70 and 72 which are in alignment when the strips are properly inserted. Pins 74 extend through these aligned openings and the ends of the pins may be peened or upset as in the embodiment of the invention previously described.

As a result of the foregoing construction each tooth of the cutter comprises relatively thin blade supporting portions 76 with the intervening slots 54, and the tooth portions 66 of the strips 60 are retained in the slots 54 by the pins 74.

The strips 60 may be produced economically by assembling a multiplicity of rings in face to face relation and producing the tooth elements thereon by conventional methods such for example as hobbing. The profiles or side faces of the teeth may be finished by grinding, after which the rings may be cut into two or more segments for assembly into the slots of the cutter body. If the strips are formed of high speed steel the material will be hardened prior to grinding.

It will be appreciated that the blank may be produced by hobbing or other conventional type of gear manufacture and that the slots intermediate the blade supporting portions may be produced by a circular cutting operation so that corresponding slots in the several teeth occupy a continuous circumferential plane perpendicular to the axis of the cutter blank.

The advantages of carbide or other hard material inserted cutting blades is well known and these advantages are obtained for the first time in gear shaving cutters in a practical manner. In the event of damage to one or more of the independent inserted cutting blades, it will be readily apparent that the associated pin may be quickly removed and the damaged blade replaced.

The drawings and the foregoing specification constitute a description of the improved inserted blade gear shaving cutter in such full, clear, concise and exact terms as to enable any person skilled in the art to practice the invention, the scope of which is indicated by the appended claims.

What I claim as my invention is:

1. A gear shaving cutter in the form of a unitary gear-like member having its teeth slotted to provide slots perpendicular to the axis of the member and leaving parallel blade supporting portions perpendicular to the axis of the member, the teeth of said member each having a hole extending longitudinally therethrough and substantially centrally thereof, blades of hard cutting material such as tungsten carbide received snugly in the slots between said blade supporting portions having tooth portions extending laterally beyond the sides of said blade supporting portions and having openings in alignment with the holes through said teeth, and pins extending through said holes and through the openings in said blades.

2. A cutter as defined in claim 1 in which the ends of said pins are upset in countersunk ends of the holes through said teeth, the ends of said pins being substantially coplanar with the ends of said teeth.

3. A gear shaving cutter in the form of a unitary gear-like member having its teeth slotted to provide slots perpendicular to the axis of the member and leaving parallel blade supporting portions perpendicular to the axis of the member, the slots terminating above the roots of said teeth to leave outwardly facing shoulders below the bottoms of said slots, the teeth of said member each having a hole extending longitudinally therethrough, blades of hard cutting material such as tungsten carbide received snugly in the slots between said blade supporting portions and having openings in alignment with the holes through said teeth, said blades having end projections at their inner ends engaging said shoulders, and pins extending through said holes and through the openings in said blades.

4. A gear shaving cutter comprising a gear-like toothed body having a plurality of narrow peripheral slots extending into said body substantially below the roots of its teeth, segmental arcuate strips having inner portions received in said slots below the roots of the teeth of the body, and having on their outer portions teeth conforming generally to the teeth of the body, the teeth of said strips being of greater circumferential extent or thickness than the teeth of said body to provide cutting blades extending outwardly from the sides of the teeth of said body.

5. A cutter as defined in claim 4 in which said strips are formed of high speed steel.

6. A cutter as defined in claim 4 in which said strips are formed of tungsten carbide.

7. A cutter as defined in claim 4 in which said strips are formed of a hard cutting material.

8. A cutter as defined in claim 7 in which the teeth of said body and said strips have openings therethrough, and pins received in said openings securing said strips in position.

9. A cutter as defined in claim 7 in which the slots in said body have a circular bottom wall, and the inner edges of said strips are of circular shape.

10. A cutter as defined in claim 7 in which the root portions between the teeth of said strips are laterally enlarged to provide channels in the cutter.

11. A cutter as defined in claim 10 in which the enlargements are smoothly rounded at their ends.

References Cited in the file of this patent

UNITED STATES PATENTS

| | | |
|---|---|---|
| 869,574 | Huther | Oct. 29, 1907 |
| 2,119,298 | Simowski | May 31, 1938 |
| 2,126,178 | Drummond | Aug. 9, 1938 |
| 2,141,771 | Sparling | Dec. 27, 1938 |
| 2,171,325 | Hawgood | Aug. 29, 1939 |
| 2,228,968 | Miller | Jan. 14, 1941 |
| 2,305,145 | Dalzen | Dec. 15, 1942 |
| 2,338,061 | Ross | Dec. 28, 1943 |
| 2,354,144 | Ross | July 18, 1944 |